United States Patent
Rosensteel, Jr.

(10) Patent No.: US 6,363,391 B1
(45) Date of Patent: Mar. 26, 2002

(54) APPLICATION PROGRAMMING INTERFACE FOR MONITORING DATA WAREHOUSE ACTIVITY OCCURRING THROUGH A CLIENT/SERVER OPEN DATABASE CONNECTIVITY INTERFACE

(75) Inventor: Kenneth R. Rosensteel, Jr., Phoenix, AZ (US)

(73) Assignee: Bull HN Information Systems Inc., Billerica, MA (US)

(*) Notice: Subject to any disclaimer, the term of this patent is extended or adjusted under 35 U.S.C. 154(b) by 0 days.

(21) Appl. No.: 09/086,818

(22) Filed: May 29, 1998

(51) Int. Cl.[7] .............................................. G06F 17/30
(52) U.S. Cl. ........................... 707/102; 709/223; 707/2; 707/10
(58) Field of Search ...................... 707/10, 2, 100–103; 709/223

(56) References Cited

U.S. PATENT DOCUMENTS

| | | | | |
|---|---|---|---|---|
| 5,675,785 A | * | 10/1997 | Hall et al. | 707/102 |
| 5,721,903 A | * | 2/1998 | Anand et al. | 707/5 |
| 5,832,496 A | * | 11/1998 | Anand et al. | 707/102 |
| 5,870,746 A | * | 2/1999 | Knutson et al. | 707/101 |
| 5,918,224 A | * | 6/1999 | Bredenberg | 707/2 |
| 5,918,225 A | * | 6/1999 | White et al. | 707/3 |
| 5,970,490 A | * | 10/1999 | Morgensten | 707/10 |
| 6,167,405 A | * | 12/2000 | Rosensteel, Jr. et al. | 707/102 |

OTHER PUBLICATIONS

Data Warehousing An Introduction, by Grayce Booth, Groupe Bull Technical Update, May/Jun. 1995, pp. 1–9, Copyright 6/95, Bull S.A., France.

The Distributed Data Warehouse Solution, by Kirk Mosher & Ken Rosensteel, Groupe Bull Technical Update, May/Jun. 1995, pp. 11–18, Copyright 6/95, Bull S.A., France.

System Security and Management in a Distributed Data Warehouse Environment, by Denis Pinkas, Ken Rosensteel, and Martin Schiavo, Groupe Bull Technical Update, vol. 6, No. 2, pp. 13–22, Copyright.

Bull HN Information Systems Inc. and Bull S.A., 1996, Billerica, MA. and France.

DDW Adminstrator's Guide, Order No. 86 A2 83FC REV 4, Release Date: Apr. 25, 1997, Copyright Bull S.A & Bull HN 1995, 1996, 1997.

* cited by examiner

*Primary Examiner*—Hosain T. Alam
*Assistant Examiner*—Jean Bolte Fleurantin
(74) *Attorney, Agent, or Firm*—Faith F. Driscoll; John S. Solakian (57) ABSTRACT

An Application Programming Interface (API) provides interoperability between different monitoring and administrative components of a data warehouse system that utilizes different standard protocols. One of the protocols is the well known data connectivity protocol, Open Database Connectivity (ODBC) that defines a standard interface between applications and data sources. A second one of the protocols is the well known network management protocol, Simple Network Management Protocol (SNMP) that defines a standard interface between an agent component and a network management system. The API provides a facility that enables the different components to access user and connection information maintained by an ODBC server component derived from servicing client system application SQL queries made by system users.

34 Claims, 3 Drawing Sheets

APPLICATION PROGRAMMING INTERFACE FOR MONITORING DATA WAREHOUSE ACTIVITY OCCURRING THROUGH A CLIENT/SERVER OPEN DATABASE CONNECTIVITY INTERFACE

BACKGROUND OF THE INVENTION

1. Field of Use

The present invention relates to systems and methods for monitoring information accesses and more particullrly the usage of a data warehouse and the information contained therein.

2. Prior Art

Data warehouses are becoming more and more important to businesses. The term "data warehouse" is generally used to describe a database containing data that was gathered from a variety of sources (e.g. existing production databases). For more information regarding the nature of a data warehouse, reference may be made to the article entitled, "Data Warehousing: An Introduction" by Grayce Booth which appeared in the May/June 1995 issue of the Bull S. A. technical journal entitled, "Technical Update."

Typically, the data warehouse is implemented as a large amount of data stored in a database with access to the data coming from hundreds of users executing commodity applications like Excel, running on personal computers (PCs). Here, an opportunity for a business exists to manage the data warehouse system. It is useful to the warehouse owner to have information and statistics about the usage of the warehouse and its data. Such information includes: (a) how many users are currently logged onto the system; (b) what is the pattern of access statistics; (c) what data is accessed most frequently, (d) what if any indexes could be added or dropped to improve access efficiency; (e) what if any unlawful access attempts have occurred; and (f) what query runs the longest. Some of this information can be obtained from the warehouse database system but each type of database gathers this information in a different proprietary manner. Therefore, there is an opportunity to be able to provide usage data in a standard fashion for all database types. Also, there is the ability to provide the information through standard system management tools based on standard protocols, such as the Simple Network Management Protocol (SNMP).

As well known in the art, the Open Data Base Connectivity (ODBC) application programming interface is a standard defined by Microsoft Corporation by which Windows based tools and applications may access different databases on many different server platforms. Many PC vendors have adopted ODBC. Without using ODBC, applications are required to use APIs specific to a database vendor for accessing data warehouse information. Using ODBC, an application may access any type of database. In addition, ODBC is used by application tools such as EXCEL such that specific code is not required for each database type being accessed.

Client/Server ODBC is a newer technique for implementing ODBC. The interface to ODBC for user applications remains on the PC but the bulk of the ODBC logic is moved to a server side implementation. All PC users execute their data requests through a common ODBC server. This arrangement provides a "thin" client requirement for the PC user of ODBC and makes the administration of ODBC possible from a single server. This single point of access through the ODBC server also provides the opportunity for administrating the data warehouse. All clients PCs that need to access the data warehouse come through the single point of access (Le. ODBC server).

Although ODBC provides a common PC based API, each relational database management system (RDBMS) vendor typically has implemented a unique interface for data access. To adapt tools based on ODBC to the interfaces used by various types of RDBMS, Microsoft Corporation specifies the development of a "driver". The driver transforms the ODBC API standard calls into RDBMS specific calls. The use of ODBC provides a layer of consistency above each of the APIs implemented by the RDBMS vendors. In the prior art, a separate ODBC driver was required for each type of RDBMS to be accessed. Additionally, each database vendor typically, requires a tailored communications link An improvement to this approach is to provide a single data access (DDA)ODBC driver to replace multiple customized ODBC drivers with a single implementation that can access multiple types of databases.

An example of the above type of system is the distributed data warehouse (DDW) middleware described in the article entitled, "The Distributed Data Warehouse Solution"by Kirk Mosher and Ken Rosensteel that also appeared in the above referenced May/June 1995 of the Technical Update Journal. This system utilizes a proprietary based infrastructure called DDW/NET that works in conjunction with the DDW/ODBC driver. DDW/NET enables connections to multiple computer architectures, operating systems, and network protocols. The DDW/NET software resides on each of the legacy and server systems that communicate over standard communications links and hides the details of networking from the upper layers of software on each system.

The above prior art system included several features to aid the administrator of the data warehouse. Such features included an SNMP agent that monitored the activity of the distributed data warehouse (DDW) processes and users of the data warehouse and a Usage Monitor facility that recorded SQL database queries issued by individual users. Each of these features required the use of an interface to the DDW Net on a UNIX based platform to help gather the required information. This approach required the use of proprietary interfaces that made it difficult to expand the types of databases used by the system. The data that was needed was not easily accessible from the DDW Net memory. DDW Net design was based on Ingres technology, that could not be easily enhanced. This prior art approach is described in the publication entitled DDW Administrator's Guide, dated Apr. 25, 1997, copyright Bull S. A. and Bull HN Information Systems Inc. 1995, 1996, 1997, Order Number 86 A2 83FC Rev4.

Accordingly, it is a primary object of the present invention to provide a system and method for facilitating monitoring of data warehouse activity.

It is a further more specific object of the present invention to provide an interface arrangement that simplifies data warehouse monitoring through standard protocols.

SUMMARY OF THE INVENTION

The above objects are achieved in a preferred embodiment of the present invention that provides a special application programming interface (API) that provides interoperability between standard protocols utilized in conjunction with the monitoring and administration managing tool components of a data warehouse system. One protocol is the well known data connectivity protocol Open Database Connectivity (ODBC), that. defines a standard interface between applications and data sources. Another protocol is the well known network management protocol Simple Network Management Protocol (SNMP) that defines a standard interface between an agent component and a network management system.

In the preferred embodiment, the warehouse components include a local SNP agent component for gathering data pertaining to the activity of a distributed data warehouse (DDW) processes and the users of the DDW system and a usage monitor component for tracking statistics about the different types of SQL queries issued by individual system users. According to the present invention, the warehouse components further include ODBC server and driver components for operatively connecting to the DDW system target warehouse database for processing SQL queries submitted by warehouse knowledge workers. The ODBC server component also operatively couples to an SQL log that it uses to maintain entries pertaining to user SQL queries it receives from a number of ODBC client user systems. The usage monitor component operatively couples to the SQL log and performs the function of gathering data from the entries that it uses to populate tables of a usage monitor database that it maintains for providing usage statistics.

The SNMP agent component performs further monitoring functions. The component operatively couples to the ODBC server component through the special API that enable such components to have access to a variety of types of information received from the ODBC server through the ODBC protocol and reportistore such information in a MIB database of a further warehouse component that corresponds to a centrally located SNMP server component via the SNMP protocoL In accordance with the present invention, the special API provides the following types of information: Server Listen Address and Number of Active Connections. For each active connection, the Connection ID, login time, number of messages sent, number of messages received, number of bytes received, last message and last message direction. Additionally, the API provides other configuration information relevant to the server such as network ports used and server name. The special API is used by the local SNMP agent component to gather real time information about data warehouse usage and reports that information to the centrally located manager server unit.

In accordance with the teachings of the present invention, the ODBC server component operatively records entries having a predetermined format (e.g. ASCII format) into two log files. Entries for every user login to the ODBC server component are recorded in the first log file. Every SQL statement sent to the ODBC server component and information identifying the user that issued the statement, the time of execution, the elapsed time of the etc. is recorded in the second log file. The usage monitor component periodically reads the second log file and writes the statistics about usage into the usage monitor database. By using the ODBC serve information, no software components need be inserted between the end users and the data warehouse to gather the usage information. Since the OD The above objects and advantages of the present invention will be better understood from the following description when taken in conjunction with the accompanying drawings.

DESCRIPTION OF THE PREFERRED EMBODIMENT

FIG. 1

Figure 1:
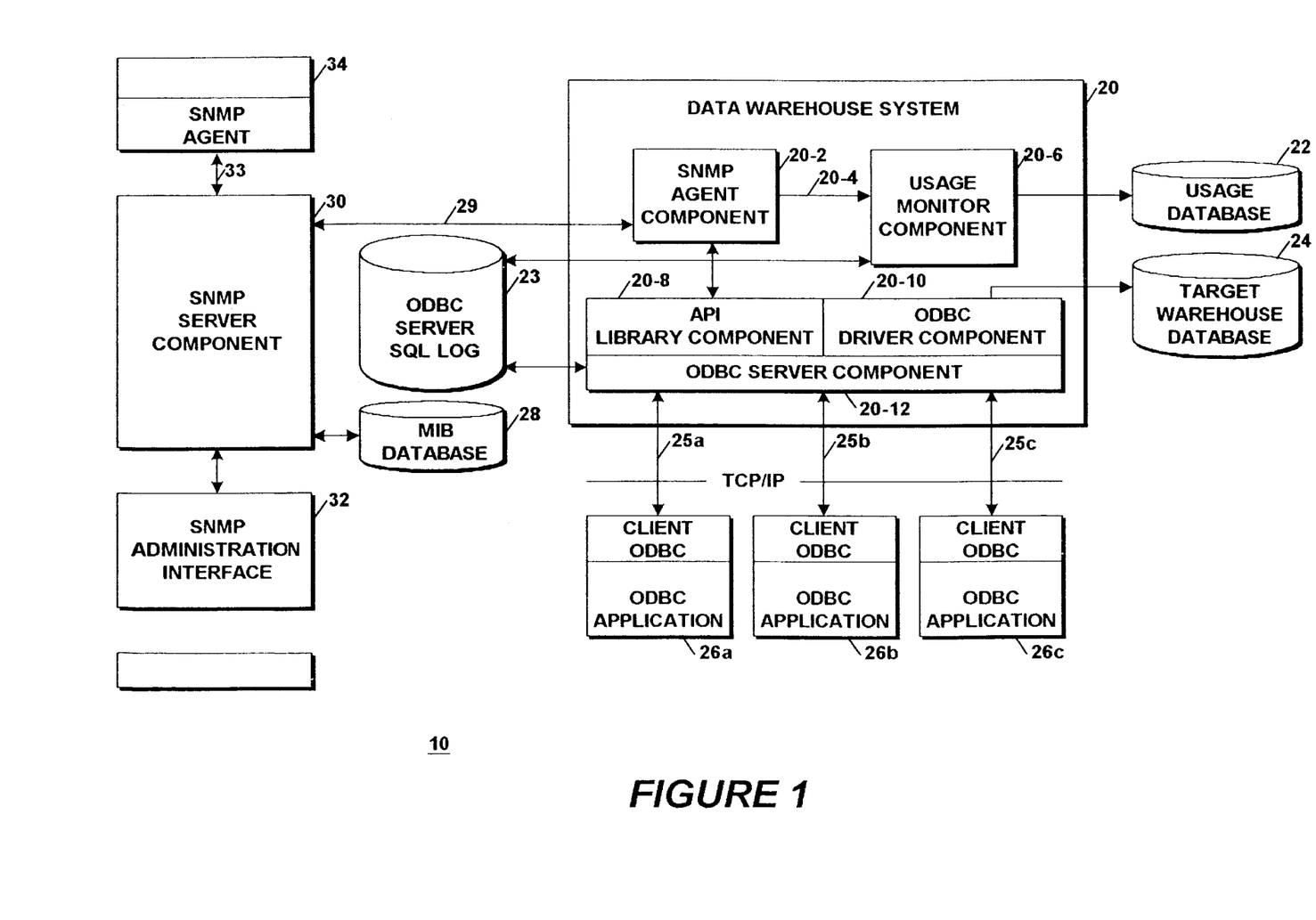
FIG. 1 is an overall block diagram of a data warehousing system that includes the API of the present invention.

FIG. 1 is a block diagram of a distributed data warehousing (DDW) system 10 that includes the Application Programming Interface (API) of the present invention. As shown, the DDW system 10 includes a target data warehouse system 20 that operatively connects to a plurality of ODBC Windows based personal computer (PC) client systems 26a through 26c over a corresponding number of communications links 25a through 25c and to an SNMP server component 30 over a communications link 29. The data warehouse system 20 manages a target warehouse database 23 representing the database that implements the data warehouse or data mart. As indicated, the DDW system 10 utilizes client/server ODBC technology that removes the requirement for a DBMS network connection on the client system and software requirements. That is, the PC software requirement is reduced to the application to be run, the ODBC client software and a WinSock TCP/IP connection. The interface to the ODBC client system remains consistent with the ODBC interface standard requiring no changes to existing applications. An ODBC server component 20-12 is used to make the connection to the client systems. The ODBC server component 20-12 acts as an application to a standard ODBC driver component such as component 20-10. The ODBC server component 20-12 runs as any other application in an assigned area of memory that it uses to provide routines and store table structures required for processing database queries and responding to API calls. The organization of the ODBC allocated memory area will be discussed in greater detail with reference to FIG. 2.

The ODBC driver component 20-10 provides the access to the target database 24 that may be implemented as any one of a number of well-known vendor database systems (e.g. ORACLE, INFORM=, etc.). When more than one type of database system is used, the ODBC server component 20-12 utilizes Windows ODBC driver manager software. This software provides a thin layer interface to a number of different DBMS ODBC drivers that enables applications to easily load such drivers into their applications and thus remain DBMS independent As shown, the ODBC server component 20-12 operatively couples to an ODBC server SQL database/log 23 that it uses to maintain information entries having a predetermined format for recording client application DBMS accesses. Each database write is made via the ODBC server component 20-12 that in turn results in the appropriate log entries being written into the SQL log 23.

For the purposes of the present invention, the ODBC components may be implemented with standard ODBC software components provided by Microsoft Corporation. The implementation of ODBC drivers is well known in the art. For example, reference may be made to an article entitled "Writing ODBC Drivers" by Dennis R. McCarthy, published in the November 1995 issue of the publication, Dr. Dobb's Journal As shown, the SNMP server component 30 also connects to other SNMP agents via communications links such as SNMP agent 34 via a communications link 33. More specifically, SNMP server component 30 includes SNMP dispatcher daemon software that enables the component to host more than one SNMP agent at the same time. The SNMP server 30 includes an SNMP administration interface 32 and a Management Information Base (MIB) database 28. The MIB database 28 is organized in a tree structure whose branches identify information objects. Each object within the MIB corresponds to an item of information In the preferred embodiment, a level of the tree structure is allocated to data warehouse objects. This organization is described in greater detail, in the above referenced DDW Administrator's Guide. An appendix included herein provides a list of data warehouse objects utilized by the API of the present invention.

The system 20 includes a set of tool components that includes an SNMP agent component 20-2 that operatively couples to a usage monitor component 20-6. The SNMT agent component 20-2 is the facility utilized to administer the data warehouse system 20 from the SNMP manager server unit 30 via communications link 29 utilizing the SNMP protocol.

The SNMP agent component 20-2 contains the necessary mechanisms for gathering data from the ODBC server component 20-12 as described herein The SNMP agent component 20-2 utilizes the SNMP server unit's MIB database 23 for recording required information utilized in monitoring activities conducted via the SNMP administration interface 32. In the preferred embodiment, the SNMP server unit 30 and interface 32 corresponds to the ISM server developed and marketed by Bull HN Information Systems Inc.

The usage monitor component 20-6 also operatively couples to a usage database 22 and to the ODBC server SQL log 23. The component 20-6 uses the information contained in log 23 for generating and maintaining statistics pertaining to client user database activities.

Figure 2:
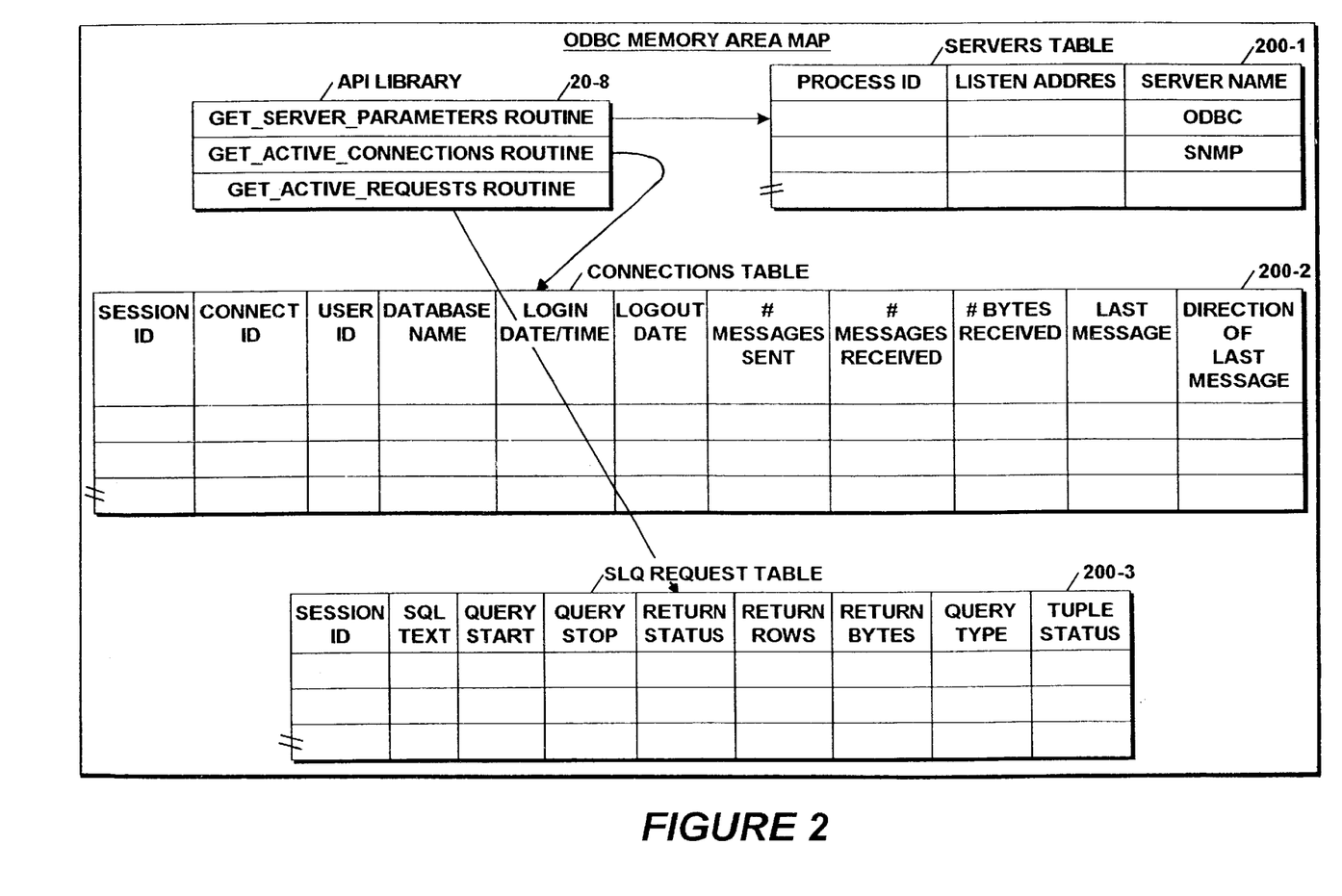
FIG. 2 illustrates a memory map organized according to the present invention.

The SNMP agent component 20-2 operatively couples to the ODBC server component 20-12 through an API library component 20-8 constructed according to the teachings of the present invention. As described herein in greater detail the API library component 20-8 that can be considered part of the ODBC server component 20-12. The component 20-8 provides a number of functions that enable the tool components of the warehouse system 20 to cooperate with the ODBC server component 20-12 in a manner required to carry out the required monitoring and administration of client system activities. FIG. 2-Memory Map FIG. 2 illustrates in greater detail, the organization of the allocated memory area utilized by the ODBC server component 20-12. As shown, the memory area includes the API library component 20-2 and several key tables utilized by ODBC server component 20-12. These key tables are: a servers table 200-1 for keeping track of servers (ODBC or SNMP), a connections table 200-2 for keeping track of active end user connections that are using ODBC client software to query the data warehouse, and a requests table 200-3 for keeping track of active SQL requests from the end users.

The API library has one function call per each of the ODBC server tables. Each of the API library calls will return all of the rows of the table being addressed. The first invocation of the function takes a snapshot of the ODBC server memory and allows all of the ODBC operations that will affect the contents of the memory to continue. This first call then returns the first entry from the table. Subsequent calls to the API return the subsequent rows of the snapshot, until an end of file (EOF) indicator is reached. The EOF is signaled through a "RETURN_CODE" parameter of the function call. The API functions are set forth in greater detail in an Appendix.

DESCRIPTION OF OPERATION

Figure 3:
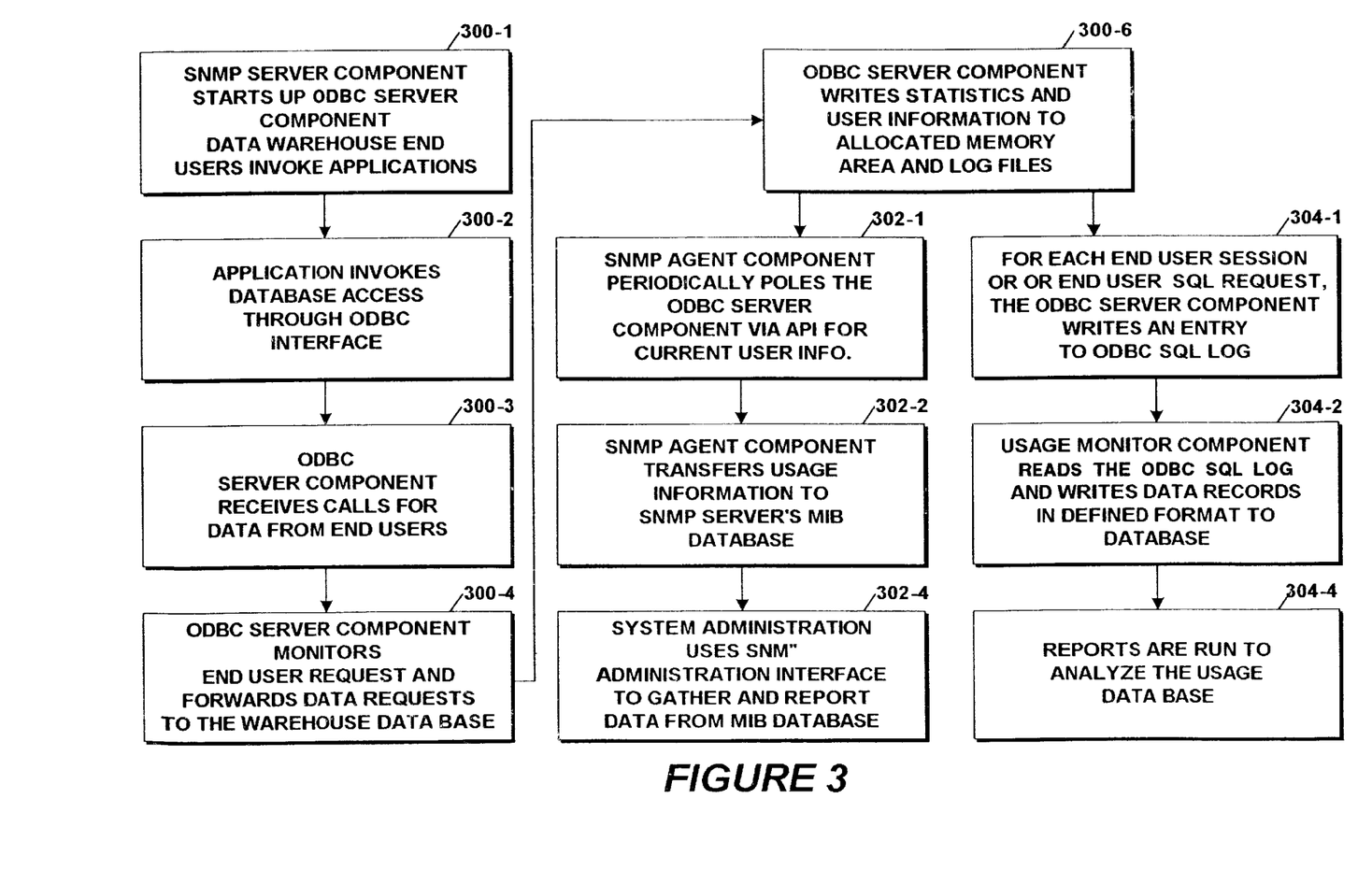
FIG. 3 is a flow chart used in describing the operation of the present invention.

With reference to FIGS. 1 through 3, the operation of the preferred embodiment of the present invention will now be described relative to the flowchart of FIG. 3. Referring to FIG. 3, it is seen from block 300-1 that initially, the systems are activated. That is, the ODBC server component 20-12 is started up by the administration SNMP Administration interface component 32. Startup is invoked using appropriately Korn shell scripts implemented in a conventional manner. In addition, ODBC applications such as EXCEL are assumed to have been loaded and running on the client systems 26a through 26c. During the running of these applications, end users issue queries that invoke access to target warehouse database 24 as indicated by block 300-2. This results in the ODBC client software generating calls to the ODBC server component 20-12 as indicated in block 300-3. Each call utilizes the ODBC interface protocol that proceeds via TCP/IP network interfaces.

As indicated in block 300-4, the ODBC server component 20-12 monitors for end user requests and forwards the end user SQL access request to the data warehouse database 24 via ODBC driver component 20-10. In response to each call, as indicated in block 300-6, the ODBC server component 20-12 stores the pertinent statistics and user/connection information as entries in the tables 200-1 through 200-3 located in its memory area as indicated in FIG. 2. As discussed herein, it also stores information entries pertaining to the particular SQL query obtained from its tables in the ODBC SQL log 23. Such entries are recorded in two ASCII log files. The first log receives an entry for every user login to the ODBC server component 20-12, the entry is designated as a user session record that contains a number of specified attributes. The second log file receives the SQL statement received by the ODBC server component 20-12, as well as a number of attributes such as information indicating the user that issued the statement, the time, etc.

In greater detail the ODBC SQL log files are formatted to contain the following information:

Log 1: User_Session record (attributes-User_name, database-name, login-date, logout_date, Session ID);

Log 2: User_Requests record (attributes-Session_ID, SQL_Text, Query-time, Return-Status, Return_Rows, Return-Bytes, Query-Type, Tuple_Size).

Thus, as indicated in block 300-6, the ODBC server component 20-12 writes statistics and user information into the tables contained in its memory area and into the log files in accordance with the Log 1 and Log 2 formats.

As indicated in FIG. 3, blocks 304-1 through 304-4 indicate how the usage monitor component 20-6 performs its functions relative to creating entries in usage database 22. As indicated in block 304-1, for each end user session (end user connection), the ODBC server component 20-12 writes an entry into the SQL log 23 in the format described above. Subsequently, for each user that is logged on, for each SQL request, a log entry will be made to the SQL log 23 as indicated above. Since there are many users, these log entries will represent the random requests of many users. It is seen that the request information is only temporarily stored in the request table 200-3 contained in the ODBC server component's memory area. Once written to the log 23, that entry in the SQL Request table 200-3 in the ODBC memory area is removed. The usage monitor component reads the ODBC SQL log 23 and writes data entries to a database record in a defined format as indicated in block 304-2.

The usage monitor component 20-6 then runs reports to analyze the usage database as indicated in block 304-4. Queries to summarize the entries by user, by time of day, by data warehouse table accessed, by query elapsed time, by row size returned, and by query type, are examples of reports that could be run.

Blocks 302-1 through 302-4 indicate how the SNMP agent component 20-2 carries out its function of providing updated user information. As indicated in block 302-1, the SNMP agent component 20-2 sets an internal timer function to periodically poll the ODBC server component 20-12 via the API library component 20-8. At each polling, the SNMP agent component 20-2 issues, for example, API call Get_Active_Connections that accesses that API library routine. This routine accesses the appropriate ODBC server memory table (ie., connections table 200-2).

The ODBC server component 20-12 transfers the requested usage information received from its memory area to the SNMP agent component 20-2. That is, the ODBC server component 20-12 obtains and returns the requested information to the SNMP agent component 20-2.

Next, as indicated in block 302-2, the SNMP agent component 20-2 transfers the usage information to the SNMP server component's MIB database 23 utilizing the SNMP protocoL More specifically, the SNMP agent component 20-2 issues a set command causing the information item(s) to be stored in the preallocated object areas of the MNB database 23 designated by the set command SNMP server component 30 in response to the set command performs the required operations for storing the usage information items. By way of example, these items could include objects defining the active connections, active servers and SQL requests issued by client end users that are formatted as indicated in the Appendix. As indicated in block 302-4, the administration interface component 32 can be used to gather and report data from the MIB database 28.

From the above, it is seen how the API of the present invention is able to provide interoperability between the monitoring and administration components of a data warehouse system utilizing an ODBC interface.

It will be appreciated that the teachings of the present invention may be used in conjunction with other types of data warehouse systems. Further, the present invention may be used with other types of application tools and interoperability protocols such as Java database connectivity protocols. Still further, the present invention may be incorporated into other types of data warehouse systems architectures. Many other changes will immediately occur to those skilled in the art.

APPENDICES

I. Glossary
II. MEB Objects and API

APPENDIX I

GLOSSARY

In the field of the present invention, the following terms have the following meanings:

1. API A set of routines used by an application program to direct the performance of procedures by the computer's operating system.
2. database management system (DBMS) A layer of software between the physical database and the user. The DBMS manages all requests for database action (for example, queries or updates) from the user. This eliminates the need for the user to keep track of the physical details of file locations and formats, indexing schemes, etc.
3. SQL Originally an acronym for Structured Query Language. Now the name of the language most commonly used to access relational databases.
4. administrator an individual who carries out tasks such as creating databases and/or monitoring the use and performance of those databases.
5. database A collection of data that has meaning to an organization or to an individual and that is managed as a unit.
6. SNMP The network management protocol of TCP/IP. In SNMP, agents monitor the activity in the various devices on the network and report to the network console workstation. Control information is maintained in a structure known as a management information base (MIB).
7. MIB A management information base comprises a set of objects describing software administrated by an SNMP manager such as the Bull ISM system or HP Openview system.
8. ODBC Open DataBase Connectivity specification provided by Microsoft Corporation that specifies an application interface to heterogeneous databases. The specification is implemented by various DBMS specific drivers that map the ODBC specification to the DBMS interface.
9. User A physical person or a unit in an enterprise. A user has a distinguished name, and is associated with "Authentication"attributes (e.g. password) and "privilege" attributes (e.g. role, category, classification, etc.).

APPENDIX II

A  Data Warehouse MIB Objects
   This section of the Appendix contains example definitions of the objects defined in
   a section of the Data Warehouse MIB 28 supported by the Data Warehouse
   SNMP agent component 20-2.
Active Connections
   NbActiveConnection OBJECT-TYPE
            SYNTAX     Counter
            ACCESS     read-only
            STATUS     mandatory
            DESCRIPTION "Number of ODBC Server active connections"
                       ::= { ODBC 1 }
   ActiveCtionTable OBJECT-TYPE
            SYNTAX     SEQUENCE OF ActiveConnectionEntry
            ACCESS     not-accessible
            STATUS     mandatory
            DESCRIPTION "Table containing information for each active
                        ODBC Server connection"
                       ::= { ODBC 2 }
   ActiveConnectionEntry OBJECT-TYPE

APPENDIX II-continued

```
                SYNTAX  ActiveConnectionEntry
                ACCESS  not-accessible
                STATUS  mandatory
           DESCRIPTION  "Information on one ODBC Server active
                        connection"
                 INDEX  { ActiveCtionID },
                        ::= { ActiveCtionTable 1 }
ActiveConnectionEntry  :: = SEQUENCE {
                        ActiveCtionID
                        Counter
                        ActiveCtionType
                        INTEGER
                        ActiveCtionLoginTime
                        DisplayString
                        ActiveCtionNBMsgSent
                        Counter
                        ActiveCtionNBMsgRcvd
                        Counter
                        ActiveCtionBytesRcvd
                        Counter
                        ActiveCtionLastMsgType
                        DisplayString
                        ActiveCtionLastMsgDir
                        INTEGER
                        }
ActiveCtionID OBJECT-TYPE
                SYNTAX  Counter
                ACCESS  read-only
                STATUS  mandatory
           DESCRIPTION  "Unique Identifier for one ODBC Server
                        active connection"
                        ::= { ActiveCtionEntry 1 }
ActiveCtionType OBJECT-TYPE
                SYNTAX  INTEGER{
                        server (1),
                        client (2)
                        }
                ACCESS  read-only
                STATUS  mandatory
           DESCRIPTION  "Connection type"
                        ::= { ActiveCtionEntry 2 }
ActiveCtionLoginTime OBJECT-TYPE
                SYNTAX  DisplayString
                ACCESS  read-only
                STATUS  mandatory
           DESCRIPTION  "The log-in time for this connection"
                        ::= { ActiveCtionEntry 3 }
ActiveCtionNBMsgSent OBJECT-TYPE
                SYNTAX  Counter
                ACCESS  read-only
                STATUS  mandatory
           DESCRIPTION  "Number of messages sent since the log-in
                        time of this connection"
                        ::= { ActiveCtionEntry 4 }
ActiveCtionNBMsgRcvd OBJECT-TYPE
                SYNTAX  Counter
                ACCESS  read-only
                STATUS  mandatory
           DESCRIPTION  "Number of messages received since the
                        log-in time of this connection"
                        ::= { ActiveCtionEtnry 5 }
ActionCtionBytesRcvd OBJECT-TYPE
                SYNTAX  Counter
                ACCESS  read-only
                STATUS  mandatory
           DESCRIPTION  "Number of bytes received since the log-in
                        time of this connection"
                        ::= { ActiveCtionEntry 6 }
ActiveCtionLastMsgType OBJECT-TYPE
                SYNTAX  DisplayString
                ACCESS  read-only
                STATUS  mandatory
           DESCRIPTION  "Type of the last message sent for this
                        ODBC Server active connection"
                        ::= { ActiveCtionEntry 7 }
ActiveCtionLastMsgDir OBJECT-TYPE
                SYNTAX  INTEGER{
                        from (1),
                        to (2)
```

APPENDIX II-continued

```
            }
   ACCESS   read-only
   STATUS   mandatory
DESCRIPTION "Direction of the last message sent for
            this active connection (from or to this
            ODBC Server)"
            ::= { ActiveCtionEntry 8 }
```

The MIB section also includes object definitions for the various items included in the servers table and SQL requests table of FIG. 2.

```
B.  Application Programming Interface (API) for Monitoring Data Warehouse
    Activity
    This section of the Appendix describes the API used by the SNMP Agent to access
    the ODBC Server Administration information.
    1) GET_SERVER_PARAMETERS(
                PROCESS_ID,
                LISTEN_ADDRESS,
                SERVER_NAME,
                RETURN_CODE)
    2) GET_ACTIVE_CONNECTIONS(
                SESSION_ID,
                CONNECT_ID,
                USER_ID,
                DATABASE_NAME,
                LOGIN_DATE_TIME,
                LOGOUT_DATE_TIME,
                NUM_MESSAGES_SENT,
                NUM_MESSAGES_RECEIVED,
                NUM_BYTES_RECEIVED,
                LAST_MESSAGE,
                DIRECTION_OF_LAST_MESSAGE,
                RETURN_CODE)
    3) GET_ACTIVE_SQL_REQUESTS(
                SESSION_ID,
                SQL_TEXT,
                QUERY_START_TIME,
                QUERY_STOP_TIME,
                RETURN_STATUS,
                NUM_ROWS_RETURNED,
                NUM_BYTES_RETURNED,
                QUERY_TYPE,
                TUPLE_SIZE,
                RETURN_CODE)
```

One row is returned with each function call the function should be called repeatedly until return code EOF (end of file) is encountered.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A method for facilitating interoperability between components of a data warehouse system containing a warehouse database for storing warehouse information, the components including a number of different monitoring and administration components for monitoring users and recording information relating to the activity of warehouse processes pertaining to accessing information stored in the warehouse database, the method comprising:

(a) including in the warehouse system, an ODBC server component operatively coupled to a number of ODBC client systems for receiving SQL requests through a first standard protocol used for data connectivity, the ODBC server component being operatively coupled to the warehouse database through an ODBC driver component for accessing information from the warehouse database using the first standard data connectivity protocol;

(b) including in the warehouse system, a storage log facility operatively coupled to the ODBC server component and to a predetermined one of the different warehouse components for enabling storage of information pertaining to user sessions and SQL queries by the OBDC server component for optimizing warehouse database storage and interfaces; and, (c) including in the warehouse system an API component as part of the ODBC server component that provides interoperability between the first standard protocol and other standard protocols for enabling the different warehouse monitoring and administration components to perform their functions pertaining to the warehouse database utilizing information received from the ODBC client systems and stored in the storage log facility.

2. The method of claim 1 wherein the method further comprises the step of including in the number of different monitoring and administration warehouse components:

(d) a network agent component for performing the function of monitoring users and the activity of warehouse processes utilizing one of the other standard protocols; and, (e) an usage monitoring component coupled to the network agent component, the usage monitoring component for performing the function of recording in a usage database, information pertaining to user sessions and SQL queries issued by the individual users of the client systems to access the warehouse database.

3. The method of claim 2 further including the step of populating the usage database with records having a predefined format by the usage monitoring component accessing information from the storage log facility.

4. The method of claim 1 wherein step (b) further includes:
storing the information as entries having a predetermined format into a number of different log files.

5. The method of claim 4 wherein the method further includes the steps of:
storing entries in a first file of the number of different log files corresponding to records identifying user sessions and their attributes; and
storing entries in a second file of the number of different log files corresponding to records identifying user SQL statements and their attributes.

6. The method of claim 5 wherein each record stored in the first log file is formatted to include the following information: User_name; Database_name; Login_date; Logout-date; Session_ID; and wherein each record of the second log file is formatted to include the following information:
User Requests; Session_ID; SQL-text; Query-time; Return_status; Return_rows; Return_bytes; Query-type and Tuple-size.

7. The method of claim 1 wherein the method further comprises the step of including in the ODBC server component, an allocated memory area for storing routines included in the API component for maintaining interoperability between warehouse components and a number of table structures for storing entries pertaining to tracking servers operation, active end user database connections and end user SQL requests.

8. The method of claim 7 wherein the routines of the API component includes a first routine for obtaining parameters for the ODBC server component and warehouse server components, a second routine for obtaining information pertaining to active end user connections and a third routine for obtaining information pertaining to active SQL query requests made by end users.

9. The method of claim 7 wherein the number of table structures includes a servers table, a connections table and an SQL requests table.

10. The method of claim 7 wherein the servers table includes the following information sections: a process ID section, a listen address section and a server name section.

11. The method of claim 7 wherein the connections table includes the following information sections: session ID, connect ID, user ID, database name, login date/time; logout date/time, number of messages sent, number of messages received, number of bytes received, last message and the direction of the last message.

12. The method of claim 7 wherein the SQL requests table includes the following information sections: session ID, SQL text, query start time, query stop time, return status, number of rows returned, number of bytes returned, query type and tuple size.

13. The method of claim 2 wherein the usage monitoring component performs the functions of reading the storage log facility and writing data records in a defined format and running reports for analyzing the usage database.

14. The method of claim 7 wherein the number of different monitoring and administration warehouse components further includes an SNMP server component that operatively couples to the network agent component corresponding to an SNMP agent component and includes a MIB database for storing a number of information objects, the method further including the step of periodically polling the ODBC server component by the SNMW server component through the API component routines utilizing the one of the standard protocol corresponding to an SNMP protocol for obtaining current usage information from the table structures of the allocated memory area of the ODBC server component for transfer to a section of the MIB database allocated for monitoring data warehouse activity.

15. The method of claim 14 wherein the section is organized to contain objects being managed by the SNMP server component defining active connections, active servers and SQL requests issued by client end users.

16. The method of claim 15 wherein the method further comprises the step of including an administration interface in the SNMP server component for enabling an administrator to gather and report warehouse data activity derived from the objects stored in the MIB database.

17. The method of claim 16 wherein the method further comprises the step of including enabling the starting and stopping of the ODBC server component and for operating different ones of the warehouse components of the warehouse system.

18. A facility for providing interoperability between components of a data warehouse system containing a warehouse database for storing warehouse information, the components including a number of different monitoring and administration components for monitoring users and recording information relating to the activity of warehouse processes pertaining to accessing information stored in the warehouse database, the facility comprising:

(a) an ODBC server component operatively coupled to a number of ODBC client systems for receiving SQL requests through a first standard protocol used for data connectivity, the ODBC server component being operatively coupled to the warehouse database through an ODBC driver component for accessing information from the warehouse database using the first standard data connectivity protocol;

(b) a storage log facility operatively coupled to the ODBC server component and to a predetermined one of the warehouse components for enabling storage of information pertaining to user sessions and SQL queries by the ODBC server component for optimizing warehouse database storage and interfaces; and, (c) an API component included as part of the ODBC server component that provides interoperability between the first standard protocol and other standard protocols for enabling the different warehouse monitoring and administration components to perform their functions relating to the warehouse database utilizing information received from the ODBC client systems and stored in the storage log facility.

19. The facility of claim 18 wherein the number of different monitoring and administration warehouse components includes:

(a) a network agent component for performing the function of monitoring users and the activity of warehouse processes utilizing one of the other standard protocols; and, (b) an usage monitoring component coupled to the network agent component, the usage monitoring component recording in a usage database, information pertaining to user sessions and SQL queries issued by the individual users of the client systems to access the warehouse database.

20. The facility of claim 19 wherein the functions performed by the usage monitor component operates to access information from the storage log facility to populate the usage database with records having a predefined format.

21. The facility of claim 18 wherein the ODBC server component stores the information as entries having a predetermined format into a number of different log files.

22. The facility of claim 21 wherein the number of log files includes:

a first file for storing entries corresponding to records identifying user sessions and their attributes; and a second file for storing entries corresponding to records identifying user SQL statements and their attributes.

23. The facility of claim 22 wherein each record stored in the first log file is formatted to include the following information: User_name; Database_name; Login-date; Logout-date; Session_ID; and wherein each record of the second log file is formatted to include the following information:

User_Requests; Session-ID; SQL text; Query-time; Return_status; Return_rows; Return-bytes; Query-type and Tuple_size.

24. The facility of claim 18 wherein the ODBC server component further includes an allocated memory area for routines included in the API component for maintaining interoperability between warehouse components and a number of table structures for storing entries pertaining to tracking servers operation, active end user database connections and end user SQL requests.

25. The facility of claim 24 wherein the routines of the API component includes a first routine for obtaining parameters for the ODBC server component and warehouse server components, a second routine for obtaining information pertaining to active end user connections and a third routine for obtaining information pertaining to active SQL query requests made by end users.

26. The facility of claim 24 wherein the number of table structures includes a servers table, a connections table and an SQL requests table.

27. The facility of claim 26 wherein the servers table includes the following information sections: a process ID section, a listen address section and a server name section.

28. The facility of claim 26 wherein the connections table includes the following information sections: session ID, connect ID, user ID, database name, login date/time; logout date/time, number of messages sent, number of messages received, number of bytes received, last message and the direction of the last message.

29. The facility of claim 26 wherein the SQL requests table includes the following information sections: session ID, SQL text, query start time, query stop time, return status, number of rows returned, number of bytes returned, query type and tuple size.

30. The facility of claim 19 wherein the usage monitoring component performs the functions of reading the storage log facility and writing data records in a defined format and running reports for analyzing the usage database.

31. The facility of claim 24 wherein the number of different monitoring and administration warehouse components further includes an SNMP server component that operatively couples to the network agent component corresponding to an SNMP agent component and includes a MEB database for storing a number of information objects, the SNMP agent component being operative to periodically poll the ODBC server component through the API component routines utilizing the one of the standard protocols corresponding to an SNMP protocol for obtaining current usage information from the table structures of the allocated memory area of the ODBC server component for transfer to a section of the MEB database allocated for monitoring data warehouse activity.

32. The facility of claim 31 wherein the section of the NMB database is organized to contain objects being managed by the SNMP server component defining active connections, active servers and SQL requests issued by client end users.

33. The facility of claim 32 wherein the SNMP server component further includes an administration interface for enabling an administrator t warehouse data activity derived from the objects stored in the MEB database.

34. The facility of claim 33 wherein the administration interf facilities for enabling the starting and stopping of the ODBC server component and for operating different ones of the warehouse components of the warehouse system.

* * * * *